Dec. 22, 1970 C. ALBRECHT 3,550,050

SUPERCONDUCTING COIL WITH COOLING MEANS

Filed Aug. 19, 1968

3,550,050
Patented Dec. 22, 1970

3,550,050

SUPERCONDUCTING COIL WITH COOLING MEANS

Cord Albrecht, Erlangen, Germany, assignors to Siemens Aktiengesellschaft, a corporation of Germany Filed Aug. 19, 1968, Ser. No. 753,649
Claims priority, application Germany, Aug. 17, 1967, 1,614,582
Int. Cl. H01f 7/22
U.S. Cl. 335—216 13 Claims

ABSTRACT OF THE DISCLOSURE

A superconducting magnetic coil with a winding whose cooling possibilities have been considerably improved. In accordance with the invention, the tape-shaped conductor of the coil winding has three layers of which the two outer ones are comprised of superconducting material and electrically normal conducting metal and the middle layer is comprised of a material which possesses high tensile strength. Cooling ducts are provided between the outer layers and the insulation placed upon said layers and/or between the outer layers and the middle layer.

Figure 1:
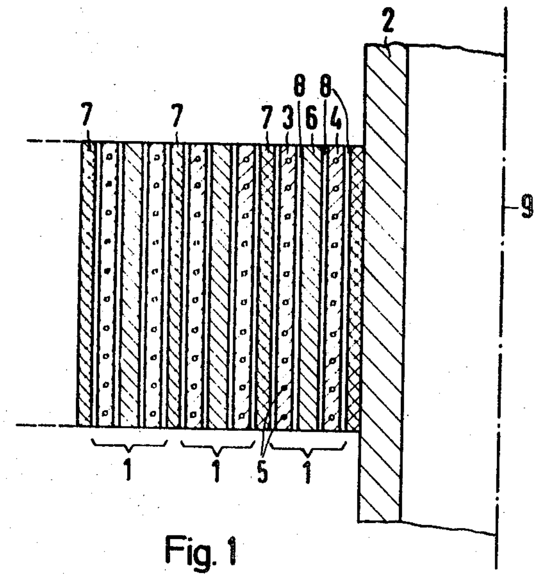

The present invention relates to a superconducting coil with a winding of mutually insulated turns, comprised of a tape-shaped stratified conductor, composed of superconducting material and electrically normal conducting metal and provided with a reinforcement of a high tensile strength material.

So-called stabilized conductors, which are composed of superconducting and, during operational temperature of the coil, good electrical-normal conducting metals, are preferable for construction of superconducting coils, particularly for large superconducting magnets. The cross section and low temperature conductivity of the normal conducting metal in these conductors are such that during the transition of the superconducting material into the critical state or condition as a result of a current exceeding the critical current, the current which flows through the superconducting material is partially or completely taken over by the normal conducting metal. In this way the transition of the superconducting material from superconducting to normal conducting state or condition can take place continuously and reversibly with the superconducting state re-establishable by a slight reduction of the current. Since the temperature of such a conductor must not exceed the critical temperature of the superconducting material even during the transition of the superconducting material into the critical state, the conductor must have the best possible cooling.

Since, furthermore, particularly in association with large magnet coils, considerable radial forces occur which lead to strong tensile stress of the conductors which form the coil, said conductors are reinforced with a high tensile strength material, for example refined steel, i.e. a superior alloy steel. In a known, stratified, stabilized, reinforced conductor, a tape with a surface layer of the superconducting compound niobium tin is coated on each side with a copper band. Each copper band in turn is reinforced with a band of alloy steel. All five bands are mechanically rigidly interconnected, by means of soldering. Such conductors, however, entail the disadvantage when the superconducting coil is used in the winding that the surfaces of the stabilizing, normal conducting metal cannot be directly contacted by the coolant which cools the coil. This may have a detrimental effect upon the stabilizing action of the normal conducting metal.

The present invention has among its objects to provide a superconducting magnetic coil with a winding whose cooling possibilities have been considerably improved. This is achieved by using a tape-shaped conductor of the coil winding with three layers of which the two outer layers are comprised of superconducting material and electrically normal conducting metal and the middle layer is comprised of a material which possesses high tensile strength. Cooling ducts are provided between the outer layers and the insulation placed upon said layers and/or between the outer layers and the middle layer.

Since the reinforcement is in the middle of said tape-shaped conductor, the outer surfaces of the layers comprised of superconducting material and electrically good normal conducting metal can be kept open for the admission of the coolant whereby the heat removal surface is considerably larger than in the known conductor.

The cooling ducts may be provided as grooves which run diagonally to the longitudinal direction of the tape-shaped conductor and may be impressed into the electrically normal conducting metal. The grooves are preferably provided at the surfaces of the outer layers of the tape-shaped conductor facing the insulation, or at the outer layer surfaces facing the middle, reinforced layer or even at both surfaces of the outer layers.

The cooling ducts between the insulation and the tape-shaped conductor may also constitute grooves provided in the side of insulation facing the outer layers of the conductor. In this instance, the outer layer surfaces of the tape-shaped conductor which face the insulation may be smooth. For example, the grooves may be impressed into the insulation, or webs or measas of insulating material may be fastened at an insulating band to produce the grooves.

The insulation between the windings of the coil may be an insulating band wound together with the tape-shaped conductor into the coil winding and may extend parallel to said conductor. Such an insulation will be preferably used when the individual layers of the conductor are first stacked during the winding of the coil. A mechanical connection of the individual layers of the conductor, for example by soldering prior to winding the coil, is not really necessary since the conductor is held together by the winding pressure of the coil.

In another embodiment of the coil of the invention, the insulation may be comprised of one or more insulating tapes wound, at a distance between the edges of the tape, around the tape-shaped conductor. Such an insulation, placed prior to winding of the coil around the tape-shaped conductor, may simultaneously serve as a mechanical connection of the individual conductor layers. Since distances are provided between the tape edges of the insulating tapes, the coolant can flow through the insulation and may penetrate into the cooling ducts provided between the insulation and the outer layers of the conductor.

The insulating bands may be, e.g., synthetic tapes reinforced with glass fiber or glass fiber tapes, impregnated with epoxide resin.

In a particularly simple embodiment of the coil, the two outer layers of the tape-shaped conductor consist of one tape. Each layer is of electrically normal conducting metal, with several parallel superconductors embedded therein and running along the length. The tape may be comprised, for example, or particularly highly pure copper of aluminum, with wires of superconducting niobium zirconium and/or niobium titanium alloys as the superconductors.

In another embodiment of the coil, the two outer layers of the tape are comprised of several, adjacent, tape-shaped individual conductors of normal conducting electrical metal, at least one of which contains one or more embedded superconductors. Such a conductor buildup affords the possibility to compose tape-shaped conductors of various dimensions from prefabricated basic elements and to construct windings for superconducting coils with various dimensions from the same basic elements. Furthermore, the number of the embedded superconductor-containing individual conductors may be varied within the tape-shaped conductor, by substituting such individual conductors for individual conductors which do not have superconductors. Due to these substitution possibilities, the composition of the conductor may be very simply adjusted to the local magnetic field curve, within the coil winding produced from the conductor. To improve the electric contact between the tape-shaped individual conductors, the tape-shaped conductor made in this fashion may be wrapped with a tape of electrically normal conducting metal, for example copper, so that free spaces remain between the tape edges. The latter may be then utilized as coolant ducts.

A possibility exists that the two outer layers of the tape-shaped conductor for the coil winding be of several, adjacent, cord-like individual conductors, which are comprised of a plurality of wires of high field superconducting material with normal conducting electrical metal covers and, if necessary, additional wires of electrically normal conducting metal. In this embodiment, conventional, superconducting wires respectively superconducting cords may be used in the construction of the tape-shaped conductor.

In embodiments of the tape-shaped conductor where the two outer layers are composed of individual conductors, it is preferred to provide an insulation of one or more insulating tapes which are wound around the tape-shaped conductor, with a distance between the tape edges, which simultaneously serves for a mechanical connection of the individual conductors. The insulating tape, which is wound around the tape-shaped conductor, may thereby be provided at the surface facing the outer layers of the tape-shaped conductor, with a cover of electrically good normal conducting metal. Such a coating improves the electrical connection between the adjacent individual conductors. A copper coated glass fiber reinforced synthetic tape for example, is suited as the above-described tape. Furthermore, in association with these embodiments of the tape-shaped conductor, foils of good electrically normal conducting metal, such as copper, may be inserted between the outer layers of the tape-shaped conductor and the middle layer comprised of high tensile strength material. These foils also serve to improve the electrical connection between the adjacent single conductors.

The middle layer comprised of a high tensile strength material may also be wrapped around by a tape in such away that free spaces remain between the tape edges. In this embodiment, the free spaces may be utilized as ducts for the coolant. The tape may consist of a highly stable material from a mechanical point of view which may be, e.g., an alloy steel or a band of fiber glass. If the tape is to serve also for an electrical cross connection between adjacent individual conductors, it may be comprised of good electrically normal conducting material, such as copper. The middle layer of the tape-shaped conductor of high tensile strength material may be comprised particularly of an alloy steel band or of a glass fiber band.

Figure 2A:
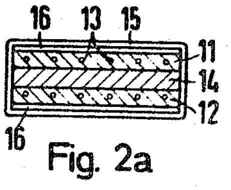
Figure 2B:
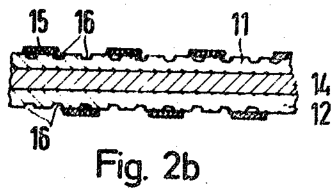
Figure 2C:
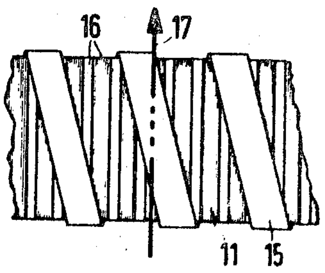

The invention will now be disclosed in greater detail with embodiment examples and the drawing, in which:

FIG. 1 shows a section of a winding of a superconducting coil, designed in accordance with the present invention;

FIGS. 2*a* to 2*c* show an embodiment of a tape-shaped conductor for a superconducting coil according to the invention;

FIGS. 3 to 8 show additional embodiments of tape-shaped conductors for superconducting coils according to the invention.

FIG. 1 shows a schematic section of the three innermost windings of a coil in an embodiment of the superconducting coil according to the invention. The winding is wrapped spirally in form of a disc-shaped winding of the tape-shaped conductor 1, around the cylindrical coil form 2, whose vertically directed longitudinal axis is indicated by the dot-dashed line 9. The coil is located in a housing (not shown) and is surrounded during the operation of the coil by a coolant, usually liquid helium. The entire coil is preferably comprised of several such disc windings, which are connected electrically in series and which may be arranged, e.g. stacked upon each other, on a common coil form 2. The tape-shaped conductor 1 is made of three layers. The two outer layers 3 and 4 consist of a good electrically normal conducting metal band into which several superconducting wires 5 extending parallel to each other are embedded. The middle layer 6 which serves as a reinforcement, is comprised of a band of a high tensile strength material, particularly of non-magnetic alloy steel. An insulating band 7 is led parallel along a wide side of the conductor 1 and is wound as a spiral together with this conductor to insulate the individual windings of conductor 1 from one another. The tapes 3 and 4 are provided with grooves both at their surfaces facing the insulation 7 and at their surfaces which face the middle reinforcement layer 6. The grooves are used as the cooling ducts. Liquid helium may flow through the cooling ducts and, therefore, is in close contact (while the coil is in operation) with the wide sides of the normal conducting tapes which contain the superconductors 5, so that the tapes are excellently cooled. The flow of the coolant in the essentially vertically directed cooling ducts 8 may be effected due to the natural buoyancy. With a forced flow of coolant, other directions may also be provided for the coil axis and the cooling ducts, e.g. they may be horizontally directed.

The individual tape portions of the tape-shaped conductor 1 do not have to be mechanically connected prior to winding the coil. Thus, they may be wound simultaneously around the coil form 2, from separate storage rollers, and are then kept together in the coil through the coil pressure. During the operation of the coil, the two outer layers 3 and 4 of conductor 1 are electrically parallel connected.

FIGS. 2*a* to 2*c* respectively show another embodiment of a tape-shaped conductor for a coil according to the present invention, in cross section, in longitudinal section and in top view. The conductor itself is comprised of two tapes 11 and 12 of a metal with good electrically normal conducting properties, with embedded superconducting wires 13, and between said tapes a band 14 of a high tensile strength material. Insulating tapes 15 are wound around the tape-shaped conductor at a relatively strong pitch, such that a space remains between the edges of the adjacent tape windings. The insulating tapes 15 are wrapped around the tape-shaped conductor prior to the winding of the coil. The surfaces of tapes or bands 11 and 12 which face the insulating tapes 15, are provided with grooves 16 through which liquid helium can flow, below the insulating tapes 15, along the surface of the tape-shaped conductor in the direction of arrow 17. The grooves 16 need not necessarily run vertically to the longitudinal direction of the tape-shaped conductor, as shown in FIG. 2*c*, but may be slightly tilted in this direction.

Figure 3:
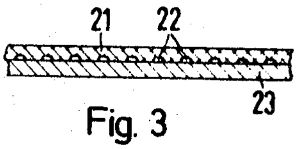

Rather than being at the surfaces, facing the insulation, of the tape-shaped conductor, the grooves for the cooling ducts may also be provided in the insulating tapes. FIG. 3 shows such an insulating tape 21 provided with grooves 22 and placed upon the smooth surface of the tape-shaped conductor 23.

Figure 4:
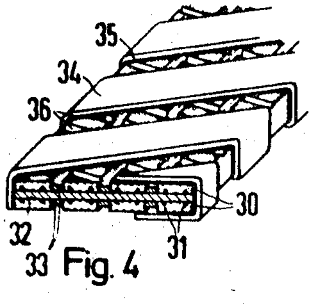

FIG. 4 shows the embodiment of a tape-shaped conductor for a coil according to the invention whose two outer layers consist of several adjacent tape-shaped individual conductors 30 of electrically good normal conducting metal each of which contains, for example, two embedded superconducting wires 31. Stays 33 have been placed upon the middle, reinforcing tape 32. These stays engaged between the individual conductors 30 to prevent them from slipping. An insulating tape 34 is wound about the tape-shaped conductor, which simultantously mechanically connects the individual parts of the conductor. On the side facing the conductors, the tape 34 is provided with a copper layer 35, which serves as a well conducting cross connection between the adjacent individual conductors 30. The surfaces of the individual conductors 30 which face the insulation and protrude somewhat beyond the stays 33, are provided with grooves 36. If the tape 34 keeps the individual conductors 30 adequately together, the stays 33 may be omitted.

Figure 5:
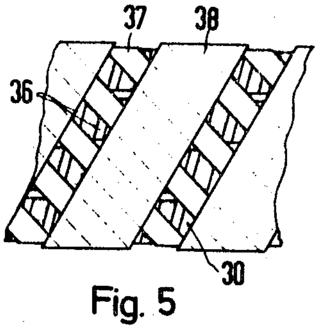

FIG. 5 shows the top view of a tape-shaped conductor built up similarly to the conductor of FIG. 4. However, instead of the copper lined tape 34 of FIG. 4, there is a wrapping of copper tapes 37 and a wrapping of insulating tapes 38 thereover, wound in the opposite direction. In addition to the grooves 36 in the surface of the individual conductors 30, the spaces between the adjacent windings of the copper tapes also act as cooling ducts. The insulating tape 38 should be wider than the copper tapes 37, so that it cannot fall into the free spaces between the copper tapes. Since the individual conductors of the tape-shaped conductor according to FIG. 5 are already held together by the copper band 37, an insulating tape, such as provided in the coil of FIG. 1, in parallel to the wide side of the tape-shaped conductor may take the place of band 38 of FIG. 5 for providing insulation.

Figure 6:
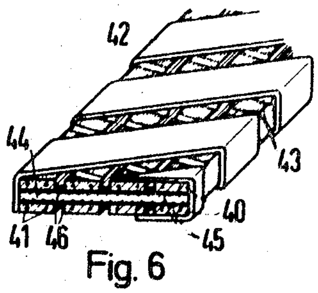

In the tape-shaped conductor illustrated in FIG. 6, the two outer layers are also comprised of adjacent tape-shaped conductors 40, which contain embedded, superconducting wires 41 and are provided with cross grooves 43 at their surface which faces the insulating tape 42. Copper foils 45, inserted between the individual conductors 40 and the middle reinforcing tape 44, effect a good electrically conducting cross connection between the adjacent single conductors 40. The copper foils are provided at their surfaces with stays 46, e.g. copper wires which are soldered upon the tape-shaped copper foil. When the tape-shaped conductor used in the production of coil windings is bent, the individual elements of the tape-shaped conductor may be displaced relative to each other, as is the case with conductors illustrated in the other figures, so that the mechanical stress to which the conductor elements are subjected is strongly reduced during the winding of the coil.

Figure 7:
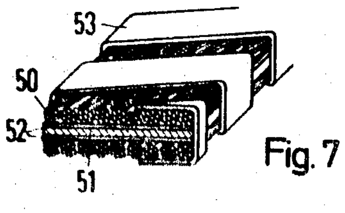

FIG. 7 shows another embodiment of a tape-shaped conductor for winding a coil in accordance with the invention. The two outer layers of the conductor consist of adjacent strand, cord or string-shaped individual conductors 50. These strand or string-like conductors are comprised of superconducting wires, provided with metal coatings with normal conducting properties. The wires are then formed into a rope. The individual conductors 50 may also contain additional wires of good electrical normal conducting metal which improve the electric stabilization. Tape-shaped copper foils 52 are inserted between the adjacent string-shaped conductors 50 and the reinforcement band 51 which forms the middle layer of the tape-shaped conductor, to effect a good electricity conducting cross connection betweet the conductors 50. A wrapping of insulating tape 53 is provided as insulation. The cooling ducts are formed in this embodiment by the free spaces between the strand-shaped conductors 50 and between the twisted wires of conductors 50. In addition, the insulating tape 53 may be provided with grooves, similarly to FIG. 3. It is possible, in place of the foils 52 with good electrical conductance, to provide also, for example, a copper lining on the inside to tape 53, as well.

Figure 8:
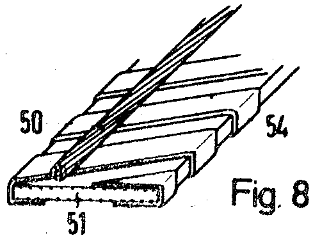

FIG. 8 shows a portion of a tape-shaped conductor which is essentially designed in the same manner as the conductor illustrated in FIG. 7. However, in place of the tape-shaped copper foils 52, copper bands 54 were provided between the strand-shaped individual conductors 50 and the reinforcement, which are wrapped around the reinforcement band 51. The free spaces between the edges of the adjacent windings of the bands 54 cause cooling ducts to form between the layers of the tape-shaped conductor, which are comprised of the strand-shaped conductors 50 and the intermediate reinforcement 51. In the embodiments of the tape-shaped conductor illustrated in FIGS. 2*a* to 6 such bands may also be wound around the reinforcement band so that cooling ducts develop between the two outer layers and the middle layer of the tape-shaped conductor.

It will be obvious to those skilled in the art that a great variety of modifications are available, and that devices according to the invention can be given embodiments other than particularly illustrated and described herein, without departing from the essential features of the invention and within the scope of the claims annexed hereto.

I claim:

1. Superconducting coil with a winding of mutually insulated turns, from a tape-shaped stratified conductor, composed of superconducting material and electrically normal conducting metal and provided with a reinforcement of high tensile strength material wherein the conductor has three layers of which the two outer layers are comprised of superconducting material and metal with normal electrical conductivity properties and the middle layer is comprised of a high tensile strength material, and insulation on the outer layers, and at least one of the two sides of the outer layers is provided with cooling ducts between the outer layer and the adjacent material.

2. The superconducting coil of claim 1, wherein at least one surface of the outer layers is provided with grooves running diagonally to the longitudinal direction of the tape-shaped conductor.

3. The superconducting coil of claim 1, wherein contact area between the insulation surface which faces the outer layers of the conductor is provided with grooves which extend diagonally to the longitudinal direction of the tape-shaped conductor.

4. The superconducting coil of claim 1, wherein the insulation comprised of an insulating tape is wound, together with the tape-shaped conductor, into the coil winding and runs parallel to said conductor.

5. The superconducting coil of claim 1, wherein the insulation is comprised of at least one insulating tape wound with a space between the edges of said insulating tape around the tape-shaped conductor.

6. The superconducting coil of claim 1, wherein the two outer layers of the tape-shaped conductor are each comprised of a tape of a metal with normal electrical conductivity having a plurality of embedded superconductors running parallel to each other.

7. The superconducting coil of claim 1, wherein the two outer layers of the tape-shaped conductors are comprised of several, adjacent, tape-shaped individual conductors of electrically normal conducting metal, at least one of which contains at least one embedded superconductor.

8. The superconductor coil of claim 7, wherein the tape-shaped conductor is wrapped about by a tape of electrically normal conducting metal with free spaces between the edges of the tape.

9. The superconductor coil of claim 1, wherein the two outer layers of the tape-shaped conductor consist of a plurality of adjacent strand-shaped individual conductors comprised of several superconducting wires with metal coatings of normal electrical conductivity.

10. The superconducting coil of claim 9, wherein the strand-shaped conductors also contain wires of electrically normal conducting metal.

11. The superconducting coil of claim 8, wherein the insulating tape, wrapped around the tape-shaped conductor, has a coating of a metal with good normal conducting electrical properties at the surface which faces the outer layers of the tape-shaped conductor.

12. The superconducting coil of claim 7, wherein foils of a metal with good normal conducting electrical properties are situated between the outer layers of the tape-shaped conductor and the middle layer of high tensile strength material.

13. The superconducting coil of claim 7, wherein the middle layer of high tensile strength is wrapped in a tape so that free spaces remain between the edges of the tape.

References Cited

UNITED STATES PATENTS

| | | | |
|---|---|---|---|
| 3,332,047 | 7/1967 | Borchert | 174—SC(UX) |
| 3,354,021 | 11/1967 | Royet | 174—SC(UX) |
| 3,363,207 | 1/1968 | Brechna | 335—216 |
| 3,432,783 | 3/1969 | Britton et al. | 335—216 |
| 3,443,021 | 5/1969 | Schrader | 174—126 |

G. HARRIS, Primary Examiner

U.S. Cl. X.R.

174—128; 335—299